(12) United States Patent
Rime

(10) Patent No.: US 9,351,600 B2
(45) Date of Patent: May 31, 2016

(54) BEVERAGE MACHINES WITH SIMPLIFIED SERVICING

(75) Inventor: Philippe Rime, Lausanne (CH)

(73) Assignee: Nestec S.A., Vevey (CH)

( * ) Notice: Subject to any disclaimer, the term of this patent is extended or adjusted under 35 U.S.C. 154(b) by 538 days.

(21) Appl. No.: 13/318,772

(22) PCT Filed: May 6, 2010

(86) PCT No.: PCT/EP2010/056194
§ 371 (c)(1),
(2), (4) Date: Feb. 21, 2012

(87) PCT Pub. No.: WO2010/128109
PCT Pub. Date: Nov. 11, 2010

(65) Prior Publication Data
US 2012/0182825 A1 Jul. 19, 2012

(30) Foreign Application Priority Data

May 6, 2009 (EP) .................................... 09159503

(51) Int. Cl.
A47J 31/36 (2006.01)
(52) U.S. Cl.
CPC .................................. A47J 31/3676 (2013.01)
(58) Field of Classification Search
CPC .................................................. A47J 31/3676
USPC .............. 366/160.1, 160.5; 222/129.2–129.4, 222/142.8, 144.5
See application file for complete search history.

(56) References Cited

U.S. PATENT DOCUMENTS

| 4,253,385 A | 3/1981 | Illy .................................. 99/281 |
| 4,377,049 A | 3/1983 | Simon et al. ..................... 40/465 |
| 4,389,925 A | 6/1983 | Piana ........................... 99/289 R |
| 4,458,735 A | 7/1984 | Houman .......................... 141/95 |
| 4,554,419 A | 11/1985 | King et al. ..................... 200/5 A |
| 4,767,632 A | 8/1988 | Meier ............................ 426/231 |
| 4,954,697 A | 9/1990 | Kokubun et al. .............. 235/381 |
| 5,312,020 A | 5/1994 | Frei ............................ 222/129.1 |

(Continued)

FOREIGN PATENT DOCUMENTS

| AT | 410 377 | 4/2003 |
| AT | 521 570 | 9/2011 |

(Continued)

OTHER PUBLICATIONS

International Search Report & Written Opinion, PCT/EP2010/056194, mailed Aug. 18, 2010.

*Primary Examiner* — David Sorkin
*Assistant Examiner* — Abbas Rashid
(74) *Attorney, Agent, or Firm* — K&L Gates LLP

(57) ABSTRACT

A machine for a given geographical market and for preparing a beverage from a combination of a first ingredient and a second ingredient. The machine includes first and second containers, container arranged for storing one of these ingredients or a packaging thereof. Such machine is so arranged as to let a user select a quantity ratio of the first and second ingredients for preparation of a beverage. The containers have normal storage volumes for their respective ingredient or packaging. The first and second normal storage volumes of the containers have a volume ratio equivalent to a ratio of respective normal volumes necessary for storing the first and second ingredients or packaging thereof used in an estimated average quantity ratio for preparing such beverage in the given geographical market.

6 Claims, 1 Drawing Sheet

(56) References Cited

U.S. PATENT DOCUMENTS

| | | | |
|---|---|---|---|
| 5,335,705 A | 8/1994 | Morishita et al. | 141/275 |
| 5,372,061 A | 12/1994 | Albert et al. | 99/281 |
| 5,375,508 A | 12/1994 | Knepler et al. | 99/280 |
| 5,645,230 A | 7/1997 | Marogna et al. | 241/27 |
| 5,731,981 A | 3/1998 | Simard | 364/465 |
| 5,836,236 A | 11/1998 | Rolfes et al. | 99/290 |
| 5,927,553 A | 7/1999 | Ford | 222/129.4 |
| 5,959,869 A | 9/1999 | Miller et al. | 364/479.01 |
| 6,182,555 B1 | 2/2001 | Scheer et al. | 99/290 |
| 6,354,341 B1 | 3/2002 | Saveliev et al. | 141/94 |
| 6,759,072 B1 | 7/2004 | Gutwein et al. | 426/433 |
| 7,028,603 B1 | 4/2006 | Gremillion et al. | 99/290 |
| 7,270,050 B2 | 9/2007 | Glucksman et al. | 99/297 |
| 7,279,660 B2 | 10/2007 | Long et al. | 219/441 |
| 7,350,455 B2 | 4/2008 | Vetterli | 99/280 |
| 2007/0157820 A1 | 7/2007 | Bunn | 99/275 |

FOREIGN PATENT DOCUMENTS

| | | |
|---|---|---|
| CH | 682 798 A5 | 11/1993 |
| DE | 44 29 353 A1 | 2/1996 |
| DE | 20 2006 019 039 U1 | 4/2007 |
| EP | 1 448 084 B1 | 8/2004 |
| EP | 1 676 509 A1 | 7/2006 |
| EP | 1 707 088 A1 | 10/2006 |
| EP | 1 744 650 B1 | 1/2007 |
| FR | 2 624 844 A1 | 6/1989 |
| GB | 2 397 510 | 7/2004 |
| GB | 2447024 A | 9/2008 |
| JP | 2001222761 A2 | 8/2001 |
| JP | 2002345618 A2 | 12/2002 |
| JP | 2003128188 A | 5/2005 |
| JP | 2005520667 A | 7/2005 |
| JP | 2007020945 A | 2/2007 |
| JP | 2010518999 A | 6/2010 |
| WO | WO 97/25634 A1 | 7/1997 |
| WO | WO 99/50172 A1 | 10/1999 |
| WO | WO 03/039309 A1 | 5/2003 |
| WO | WO03084377 A1 | 10/2003 |
| WO | WO 2004/030435 A2 | 4/2004 |
| WO | WO 2004/030438 A2 | 4/2004 |
| WO | WO 2005/104911 A1 | 11/2005 |
| WO | WO 2006/063645 A1 | 6/2006 |
| WO | WO 2006/082064 A1 | 8/2006 |
| WO | WO 2006/090183 A2 | 8/2006 |
| WO | WO 2007/003062 A1 | 1/2007 |
| WO | WO 2007/003990 A2 | 1/2007 |
| WO | WO 2008/104751 A1 | 9/2008 |
| WO | WO 2008/138710 A1 | 11/2008 |
| WO | WO 2009/043630 A2 | 4/2009 |
| WO | WO 2009/135821 A1 | 11/2009 |

BEVERAGE MACHINES WITH SIMPLIFIED SERVICING

This application is a 371 filing of International Patent Application PCT/EP2010/056194 filed May 6, 2010.

FIELD OF THE INVENTION

The field of the invention pertains to the optimisation of the normal servicing of beverage preparation machines by a user, in particular to the management of a fresh ingredient supply in the machine and of the removal of collected waste material by the machine.

For the purpose of the present description, a "beverage" is meant to include any liquid food, such as tea, coffee, hot or cold chocolate, milk, soup, baby food, etc. . . .

BACKGROUND ART

Certain beverage preparation machines use capsules containing ingredients to be extracted or to be dissolved; for other machines, the ingredients are stored and dosed automatically in the machine or else are added at the time of preparation of the drink.

Various beverage machines, such as coffee machines, are arranged to circulate liquid, usually water, from a water reservoir that is cold or heated by heating means, to a mixing or infusion chamber where the beverage is actually prepared by exposing the circulating liquid to a bulk or pre-packaged ingredient, for instance within a capsule. From this chamber, the prepared beverage is usually guided to a beverage dispensing area, for instance to a beverage outlet located above a cup or mug support area comprised or associated with the beverage machine. During or after the preparation process, used ingredients and/or their packaging is evacuated to a collection receptacle.

Whenever, the liquid reservoir is empty or the collection receptacle is full, the user must refill the reservoir or empty the receptacle, respectively, in order to be able to prepare a further beverage.

Used capsules may be collected in a machine's used capsule receptacle for instance as mentioned in EP 1 731 065. Typically, the capsule receptacle is located underneath the infusion or mixing chamber so that the capsules may fall by gravity into the receptacle upon extraction. The receptacle has to be emptied by the user when full. The receptacle may be a drawer-type removable receptacle located in a seat of the beverage preparation machine. The used capsule receptacle may be slid in and out of the machine's housing.

For allowing the user to interact with such machines, for providing operation instructions to the machine or obtaining feed-back therefrom, various systems have been disclosed in the art, for instance as mentioned in the following references: AT 410 377, CH 682 798, DE 29 353, DE 20 2006 019 039, EP 1 448 084, EP 1 676 509, EP 1 707 088, EP 08 155 851.2, FR 2 624 844, GB 2 397 510, U.S. Pat. No. 4,253,385, U.S. Pat. No. 4,377,049, U.S. Pat. No. 4,458,735, U.S. Pat. No. 4,554,419, U.S. Pat. No. 4,767,632, U.S. Pat. No. 4,954,697, U.S. Pat. No. 5,312,020, U.S. Pat. No. 5,335,705, U.S. Pat. No. 5,372,061, U.S. Pat. No. 5,375,508, U.S. Pat. No. 5,645,230, U.S. Pat. No. 5,731,981, U.S. Pat. No. 5,836,236, U.S. Pat. No. 5,927,553, U.S. Pat. No. 5,959,869, U.S. Pat. No. 6,182,555, U.S. Pat. No. 6,354,341, U.S. Pat. No. 6,759,072, U.S. Pat. No. 7,028,603, U.S. Pat. No. 7,270,050, U.S. Pat. No. 7,279,660, U.S. Pat. No. 7,350,455, US 2007/0157820, WO 97/25634, WO 99/50172, WO 03/039309, WO 2004/030435, WO 2004/030438, WO 2006/063645, WO 2006/082064, WO 2006/090183, WO 2007/003062, WO 2007/003990, WO 2008/104751 and PCT/EP08/054,858.

In particular, U.S. Pat. No. 4,767,632 discloses a beverage machine with a display adapted to display an error message, such as "COFFEE MILL DEFECTIVE", "RESERVOIR EMPTY", "WATER TANK EMPTY" or "PUMP DEFECTIVE". EP 1 707 088 discloses a coffee machine having a display or an indicator lamp to indicate that a receptacle for collecting brewed coffee is full and must be emptied. GB 2 397 510 discloses a coffee machine with a series of indicator LEDs, one of which may be used to indicate a low water level in the machine's tank. A similar interface arrangement is disclosed in U.S. Pat. No. 5,836,236 and in WO 2008/104751.

There is still a need to optimise the servicing by the user of the beverage preparation machine.

SUMMARY OF THE INVENTION

It is a preferred object of the present invention to provide a liquid food or beverage preparation machine with an optimized arrangement for the refilling of one or more of its ingredient reservoirs and/or the emptying of one or more of its waste material collectors.

Ingredient reservoirs include typically liquid reservoirs, such as a water reservoir and/or a milk reservoir, and reservoirs for storing a bulk or preportioned solid ingredient supply such as bulk ground coffee or coffee beans or coffee capsules as known in the art, for instance from EP 1 593 326 and EP 1 744 650. Other ingredients may of course be used for preparing beverages other than coffee, as for example mentioned above. Waste material collectors typically include ground coffee collectors, for instance in full-automatic coffee machines, and capsule collectors, in particular coffee, chocolate, milk, soup capsules, upon use thereof. Upon use, the capsules may be empty, for instance milk or chocolate or soup capsules, or may still contain waste ingredient such as used, extracted ground coffee or tea.

The invention thus relates to a method for manufacturing for a given geographical market a machine for preparing a beverage from a combination of a first ingredient and a second ingredient.

At least one of the ingredients may be proportioned and contained within a packaging, for instance within a capsule, to be inserted with its packaging into the machine for subsequent combination thereof with another ingredient.

For instance, the beverage preparation machine is arranged to circulate hot or cold water or another liquid, as an ingredient of the beverage to be prepared, through a capsule containing another ingredient of the beverage, such as ground coffee or tea or chocolate or cacao or milk powder or soup.

The beverage preparation machine of the method comprises a first container and a second container, each container being arranged in the machine for storing one of the ingredients and/or packagings thereof before or after use for preparing the beverage. The machine is so arranged as to let a user select, e.g. via an interface, a quantity ratio of the first ingredient and of the second ingredient for any preparation of said beverage. When the machine is arranged to prepare a beverage by the circulation of water through a proportioned ingredient capsule, this quantity ratio selection may typically amount to let the user adjust the amount of water that is used per capsule for the beverage preparation process.

The manufacturing method includes the step of providing the first and second containers with respective first and second normal storage volume for their respective ingredient and/or packagings to be stored.

In accordance with the invention, the method comprises: estimating an average quantity ratio of used first and second ingredients for preparing a beverage in the given geographical market; and configuring the first and second normal storage volumes of the containers with a volume ratio equivalent to a ratio of respective normal volumes necessary for storing the first and second ingredients and/or packagings thereof in the estimated average quantity ratio.

Hence, the method of the invention may be advantageously applied to the manufacturing of coffee machines, in particular to machines preparing coffee from ground coffee contained in a proportioned capsules inserted into the machine and extracted by the passage of water therethrough circulated from a water reservoir, the machine having a capsule receptacle for collecting the coffee capsules upon extraction. In this case, the capacity of the water reservoir is adjusted to the capacity of the used capsule receptacles so that during use, after start-up with a full reservoir of water and with an empty receptacle of used capsules, on average in the given geographical market, the water reservoir will have been emptied and the capsule receptacle have been filled at about the same time. Hence, it will be appropriate for the average user to refill the water reservoir and empty the capsule receptacle at the same time. Consequently, the number of service interruptions of the beverage preparation machine for refilling or emptying containers of the machine may be reduced in a simple manner.

The same principle is equally applicable to the so called full automatic coffee machines in which coffee beans are stored in a coffee supply reservoir, ground on-demand in a grinding module of the machine, extracted with water from a water reservoir to prepare a cup of coffee and then the extracted ground coffee is evacuated to a collection receptacle. In this case, the capacities of the collection receptacles, of the water reservoir and/or of the coffee bean reservoir may be adjusted according to the method of the invention. The beverage machine may also include a stacks of ingredient capsules that will require refilling, preferably at the same time as the one or more further containers of the machine, e.g. capsule collector and water reservoir.

Many alternative embodiments are of course be contemplated in line with the same principle, with or without using proportioned beverage ingredients. For instance, the beverage machine may include a milk reservoir for the preparation of milk-contained beverages, such as for the preparation of cappuccino or caffee latte or hot or cold chocolate. The capacity of the milk reservoir is preferably aligned to the capacity of other containers of the machine that are filled or emptied during normal use.

Hence, the refilling and emptying operations of different containers of the machine will be naturally combined, leading to fewer interruptions of the availability of the machine for normal beverage dispensing, which is more convenient for the user.

Moreover, the machine can be fitted with a level detector in only one of the containers, e.g. a water reservoir or a waste ingredient or capsule collector. As a direct consequence of the adjusted capacities of the containers, the machine may safely indicate to the user that both or all the containers need to be serviced at the same time when the detector detects a level in the corresponding container that requires servicing by the user. This leads to a simplification of the sensor and interface system of the machine.

The average volume ratio may be estimated by a survey of user preferences in the given geographical market. This may for example be carried out by testing with a panel of reference users.

In one embodiment, the machine is intended to use a second ingredient, e.g. water, combined with variations of the first ingredient, e.g. different ground coffee variations for espresso or for café lungo or for cappuccino, etc. . . . , to be prepared with different recommended quantities of the second ingredient. Assuming that the consumers will, on average, use the recommended ingredient proportions for preparing the different beverages, the average volume ratio may be estimated from the sales volumes of the different first ingredients, on the one hand, and from the recommended quantities of the second ingredient, on the other hand. In this case, the quantities of the different first ingredients in a given geographical market are known from the different sales figures in this market and from the quantity of appropriate second ingredient that may be assumed from the recommendation made to the user for each type of first ingredient.

Hence, when the first ingredient includes at least two distinct ingredient variations for preparing corresponding distinct beverage variations, each ingredient variation being intended to be combined with said second ingredient in a specific variation quantity ratio, said average quantity ratio being estimated from an aggregation of user-demand in said given geographical market of said at least two ingredient variations and corresponding specific variation volume ratios.

In practice, the given geographical market may be selected from a particular country market such as Germany or Italy, a particular regional market such as north or central America or Western Europe, a particular continental market such as Oceania, and the world market. A given geographical market may be smaller or larger than a country, e.g. an area such as one or more States of the US or German Länder or Swiss Cantons or the Benelux. A geographical market may also be an aggregation of different areas geographically connected or unconnected. Typically, a given geographical market covers a population of consumers that have a more or less identifiable culture of preparing and consuming the given liquid food or beverage. In particular, the method of the invention applied to such a given market provides results that are aligned with the habits of a significant part of the consumers in the market, e.g. that at least 33% or 40% of the consumers, in particular more than 50 or 60 or 75% of the consumers, share the same or similar habits concerning the preparation and consumption of the given liquid food or beverage. The so called "same or similar habits" regarding the quantity ratio of used first and second ingredients by the consumers, are typically comprised within a range of 0 to 10% or 0 to 5% or even 0 to 2.5% about the average quantity ratio in a given geographical market.

The invention also relates to a beverage machine incorporating the above principle. The beverage machine is configured for a given geographical market and for preparing a beverage from a combination of a first ingredient and a second ingredient. The machine has a first container and a second container, each container being arranged for storing one of the ingredients and/or packagings thereof before or after use for preparing the beverage. The machine is so arranged as to let a user select a quantity ratio of the first ingredient and the second ingredient for any preparation of beverage. The first and second containers have respective first and second normal storage volumes for their respective ingredient and/or packagings to be stored.

In accordance with the invention, the first and second normal storage volumes of the containers have a volume ratio equivalent to a ratio of respective normal volumes necessary for storing the first and second ingredients and/or packaging thereof used in an estimated average quantity ratio for preparing a corresponding beverage in such geographical market.

The first container may be a receptacle arranged to collect a waste first ingredient and/or waste packagings thereof, in particular capsules, after use for preparing a beverage, for example used ground coffee, used tea leaves, or used capsules thereof or emptied chocolate or milk or soup capsules. The second container can be a reservoir arranged to contain and supply the second ingredient, in particular a liquid such as water, for preparing said beverage.

In an embodiment, the machine has: a detecting means for detecting a predetermined level of fill in at least one of the containers; and a user-interface arranged to indicate to a user, when the predetermined level of fill is detected, that both the first and second containers need refilling and/or emptying, as appropriate, before a further beverage may be prepared.

For instance, the user-interface is arranged to indicate with an explicit text or symbol sign that both the first and second containers need refilling and/or emptying.

It is possible to provide a general explicit mention of the combined handling of the containers in a user manual of the beverage preparation machine and/or on a housing part of the machine and/or on the containers themselves.

The detecting means can be arranged to detect a predetermined level of fill in each of the containers. In this case, the user would be invited to handle both containers whenever the level in any of the containers reaches the corresponding predetermined level of fill.

In a more economic embodiment, only one of the containers is associated with the detecting means. In this case, to accommodate the container capacities to the use by non-average users, the non-monitored container should preferably be configured with an additional spare volume for compensating possible deviations from the average quantity ratio (or the monitored container be configured with a normal capacity reduced by a corresponding volume) by a non-average user. Hence, the predetermined level of fill may take into account a spare volume to compensate small deviations from the average quantity ratio during use by a non-average user. Typically, the spare volume corresponds to an additional 20%, in particular 3 to 15% such as 5 to 10%, of the normal storage volume of the container non monitored by the detecting means.

Typically, the beverage machine has a control unit for instance with a printed circuit board (PCB). The detecting means may include a sensor of the type known in the art, such as an optical detector comprising normally light emission means with one or more light sources such as LEDs electrically connected, in particular rigidly connected, to the control unit. Such an optical sensor may have a light emitter and a light receiver associated with a container and arranged to detect in the container a level of content or a presence of content at a predetermined level as known in the art. One or both of these emitter and receiver are optionally rigidly connected to the machine's control unit to facilitate assembly of the machine.

Another aspect of the invention relates to a set of machines for different given geographical markets and for preparing a beverage from a combination of a first ingredient and a second ingredient, as described above. The beverage preparation machines have generally identical first seats for receiving first containers and generally identical second seats for receiving second containers. The first and second containers of each machine of a given geographical market have respectively first and second normal storage volumes with a volume ratio equivalent to a ratio of respective normal volumes necessary for storing the first and second ingredients and/or packaging thereof used in an estimated average quantity ratio for preparing said beverage in such geographical market. The estimated average quantity ratio are different for each of the different given geographical markets.

Hence, for different geographical markets, merely the capacity of the containers need to be adjusted whereas the remaining structure of the machine may be the same. Changing the capacity of the containers may be carried out, for example by changing the thickness or disposition of the walls of the containers or by changing the inner depth of the containers.

Typically, throughout the different geographical markets, the first containers of the different geographical have a generally identical outer geometry for matching the generally identical first seats, and the second containers have a generally identical outer geometry for matching the second seats.

To rationalise manufacturing, a container may have the same capacity for all geographical markets and the capacity of the cooperating container may be adjusted for every geographical market depending of the different average quantity ratios. In this manner, the multiplication of different components may be reduced. Hence, all the first containers may have the same first normal storage volume and the second containers may have different second normal storage volumes in accordance with the different estimated average quantity ratios of the different given geographical markets, or vice versa.

A further aspect of the invention relates to a device comprising a user-interface for a beverage machine as described above. The user-interface comprises a single indicator means for indicating simultaneously to a user that first and second containers of such machine need refilling and/or emptying, as appropriate, optionally the single indicator means being connected to a detecting means for detecting a predetermined level of fill in only one of said containers, the other container remaining unmonitored by any detecting means associated with the single indicator.

Hence, by providing a single signal to the user for service both containers, the interface and control for the machine is simplified and the production costs reduced. These costs are even further reduced when the level in only one of the containers is monitored which reduces the number of detectors or sensors needed to monitor the condition of the beverage machine. Such a rationalisation of the construction of the device for the beverage machine is rendered possible by adjusting the respective capacities of the ingredient containers of the beverage machine, as explained above.

BRIEF DESCRIPTION OF THE DRAWINGS

The invention will now be described with reference to the schematic drawings, wherein.

DETAILED DESCRIPTION

Figure 1:
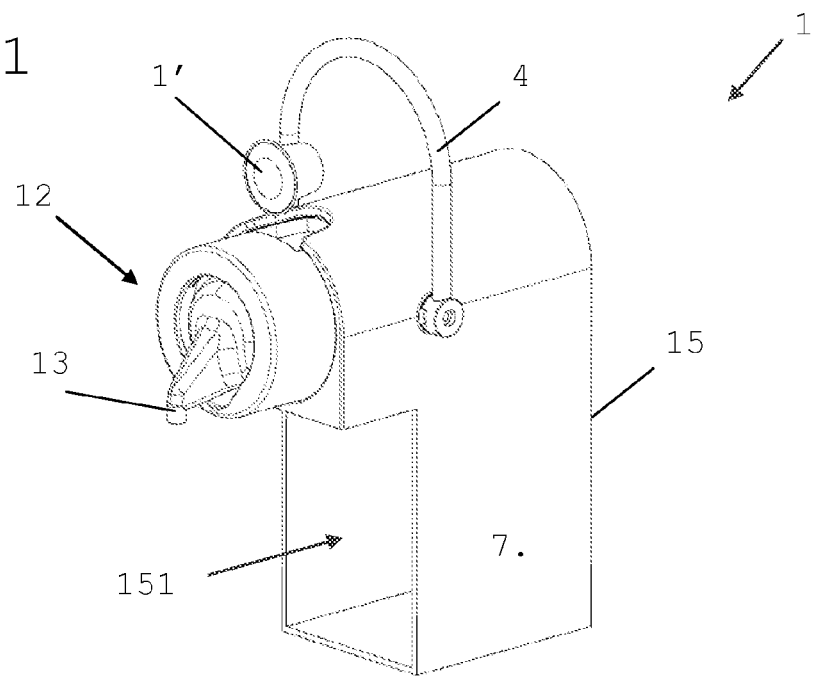
FIG. 1 shows part of a beverage preparation machine for accommodating first and second containers according to the invention.
Figure 2:
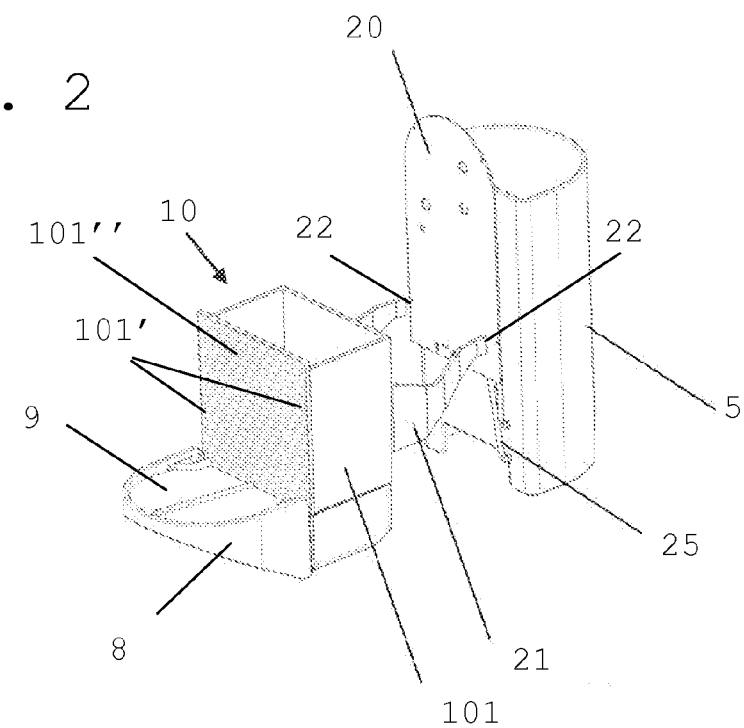
FIG. 2 illustrates a used ingredient receptacle and a water reservoir, as first and second containers, that can be assembled with the machine shown in FIG. 1.

FIGS. 1 and 2 illustrate a beverage machine 1, in particular a coffee machine. FIG. 1 illustrates machine 1 without its containers, the containers of machine 1 being shown in FIG. 2.

Machine 1 is arranged to dispense coffee from pre-proportioned ground coffee batches, for instance supplied within packages, typically capsules 1', into a brewing unit of machines 1 for extraction by passing heated water therethrough, as known in the art and as for instance disclosed in EP 1 646 305.

Machine 1 is adapted to match the average beverage preparation habits in a given geographical market and, accordingly, permit rationalisation of the handling of the machine. The beverage is prepared by combining a first ingredient, e.g. ground coffee supplied within a capsule 1', and a second ingredient, e.g. water. Capsules 1' are collected in a first container, i.e. a capsule receptacle 10, upon their use to prepare a beverage. Water is supplied from a second container, i.e. water reservoir 5, before its use to prepare the beverage.

Machine 1 is so arranged as to let a user select a quantity ratio of the first ingredient and the second ingredient for any preparation of beverage. Typically, for any extraction of a capsule 1', the user will be allowed to set or change the amount of water circulated from reservoir 5 through capsule 1', which will determine the strength and amount of beverage produced by the extraction.

Machine 1 has a housing 15 with various faces 7, 12. Housing 15 contains a heater module and a pump module for pumping and heating water from a water reservoir 5 connected to the machine's housing. Machine 1 further has a handle 4 pivotable about a front part of the machine and arranged for opening and closing a brewing unit (not shown) located thereunder, and covering and uncovering access to the brewing unit. The heated water is guided via the pump and heater to the brewing chamber containing an ingredient of the beverage, e.g. ground coffee such as pre-portioned ground coffee in a capsule 1', and thus prepared beverage is dispensed via an outlet 13 to a cup positioned underneath.

Housing 15 of machine 1 shown in FIG. 1 has a front opening 151 leading into a seat within the housing for receiving the removable drip tray assembly 8, 9, 10. Water reservoir 5 can be mounted adjacent or against a rear face of machine 1.

As illustrated, the drip tray assembly has a drip member 9 supported on a tray 8 for collecting liquid evacuated via the drip member 9. Drip member 9 also serves as a support for a cup during beverage or liquid food dispensing via outlet 13. The drip tray assembly further has a capsule receptacle 10 located underneath the machine's brewing unit for collecting used capsules 1' evacuated from the brewing unit upon brewing.

Machine 1 has an optical water level detecting means that includes light guides 21 and a control unit that includes a PCB 20 are contained in housing 15. The control unit is arranged to control various electric functions of machine 1, such the heater and the pump.

Drip tray assembly 8, 9, 10, when in place in the machine's housing 15, is spaced apart from PCB 20 by light guides 21. Between PCB 20 and drip tray assembly 8, 9, 10 extends within housing 15, part of the liquid circulation system (not shown) of beverage machine 1, in particular the water pump that is connectable to a bottom part of water reservoir 5 and to a heater and brewing unit (not shown) of liquid food or beverage preparation machine 1.

PCB 20 bears a pair of LEDs 22 at the corresponding extremities of light guides 21. The state of LEDs 22 changes when the water reaches a minimum level in the water reservoir. Light guides 21 are arranged to guide light generated by LEDs 22 to a rear edge of lateral sidewalls 101 of receptacle 10.

Since PCB 20 is narrower than the spacing between lateral sidewalls 101, light guides 22 are appropriately arched like a generally flattened S shape, so that each guide 21 has its extremities aligned with the direction of the incoming light, from LED 22, and the outgoing light, into the rear edge of wall 101 and therealong to the front, as shown in FIG. 2.

Hence, walls 101 are arranged to guide light from their rear edge to their front edge 101' which are thus illuminated by the light emitted from LEDs 22 and guided via light guide 21 and walls 101.

In order to spread light over substantially the entire height of front edge 101', light guide 21 has a generally inverted funnel shape.

In a variation, with an appropriate geometry of the light guides and refraction indicia, it is also possible to illuminate substantially the entire front wall 101'.

Light guides 22 and walls 101 are preferably made of suitable material, in particular very clear plastic material. For example, receptacle 10, in particular walls 101, is made of SMMA, which is also dishwasher fit. Light guides 21 may be made of polycarbonate plastic material.

Furthermore, water reservoir 5 is fitted with a water level sensor 25, in particular an optical sensor suitable to detect a low level of water in reservoir 5. Level sensor 25 is connected, in particular rigidly connected, to PCB 20.

When a low level of water is detected in reservoir 5 via detector 25, which corresponds to a low water condition of machine 1, the control unit activates LEDs 22 which emit light into the adjacent extremity of light guides 21. The light is then guided along guides 21 into the rear edge of walls 101. Therefrom, the emitted light spreads along walls 101 to their front edges 101' which are substantially homogeneously illuminated over their entire height.

As edges 101' have a height that corresponds to approximately a third of the overall height of machine 1, in particular of the machine's overall front face 12, a user will immediately notice the change in the general appearance of the machine and know from a distance that a special condition exists, i.e. a low water condition, and that he or she will have to refill water reservoir 5 before being able to request a beverage or liquid food preparation.

In accordance with the invention, capsule receptacle has a first normal storage volume for accumulating used capsules 1'. Water reservoir 5 has a second normal storage volume for accumulating water for the infusion of capsules 1'.

These first and second storage volumes are so dimensioned that their volume ratio is equivalent to a ratio of respective normal volumes necessary for storing the capsules and the water used in an estimated average quantity ratio for preparing a beverage in the given geographical market Hence, when water reservoir 5 needs refilling, as indicated by the chance of the state of LEDs 22, capsule receptacle 10 can also be expected to be full or nearly full.

To accommodate for non-average users, in particular users that use on average less water for preparing a beverage than the average user, the total inside storage volume of capsule receptacle 10, the content of which is not directly monitored, takes into account a spare volume to compensate such deviations. For instance, such a spare volume forms a volume of about 10 to 20% in addition to the normal volume needed in view of the estimated average quantity ratio for preparing the beverage in a given geographical market. If the level of fill of both containers 5, 10 is monitored, there is no need to provide such a spare volume.

The invention will now be further illustrated in the following numeric examples, that have been specifically carried out with the NESPRESSO™ system, more particularly, with the market of coffee machines using the frusto-conical NESPRESSO™ capsules.

Capsule Characteristics

The NESPRESSO system includes different coffee varieties supplied in corresponding frusto-conical capsules to the consumers, e.g. the espresso-type coffee or the lungo-type coffee or the café latte-type coffee. The capsules all have the same shape and same dimensions but have different colours according to the type of coffee they contain. Hence, the space occupied by the capsules in capsule receptacle 10 will not be affected by the type of coffee used. Moreover, any such NESPRESSO machine is suitable to extract frusto-conical capsules of all coffee types supplied within such capsules.

The quantity of water that is recommended for preparing these different coffee types varies from coffee to coffee. For instance, an espresso will normally need 40 ml. A lungo should be prepared with about 110 ml, as recommended.

Example 1

Based on the total user-demand of all the NESPRESSO capsules throughout the world, i.e. the given geographical market is NESPRESSO's world-wide market, and on the recommended water quantity to be used for each type of coffee capsule supplied by NESPRESSO, it is estimated that the average quantity of water that is circulated through a NESPRESSO capsule amounts to 66 ml.

It follows that, on average, the volume of water needed for a capsule 1' stored in capsule receptacle 10' corresponds to 66 ml of water in water reservoir 5. Hence, for extracting and collecting 10 capsules in capsule receptacle 10, the reservoir 5 will have to provide, on average, 660 ml. It follows that the water reservoir 10 should have a normal volume of 660 to 700 ml, taking into account that a user will hardly fill a water reservoir up to the rim. A corresponding sign may be provided on reservoir 5 indicating the level up to which reservoir 5 should be normally filled for an average use.

Optionally, a second lower sign may be provided on water reservoir for non-average users using predominantly capsules varieties that require a smaller quantity of water, for instance users that drink predominantly or exclusively espressos. The same principle is applicable for users that drink predominantly coffee varieties that require a larger quantity of water, e.g. café lungo. Hence, the user may himself adjust the normal storage volume of a container based on corresponding signs on the container and to his personal beverage preferences. More sophisticated systems are of course also contemplated such as providing a container with an adjustable storage capacity or different containers with storage capacities adjusted depending on the user preferences.

Since the level in capsule collector 10 is not monitored, a small spare volume should be provided therein corresponding to 10 to 20% of the required normal volume for storing 10 used capsules 1', i.e. an additional volume for 1 or 2 capsules 1'. In this case, the total storage volume of capsule collector 10 corresponds to the normal storage volume increased by the spare storage volume.

In practice, the normal volume for storing 10 capsules is of 400 cm3 or 400 ml. The spare storage volume would thus correspond of about 40 cm3 to 80 cm3 for a respective spare volume of 10 or 20% of the normal volume. Alternatively, instead of increasing the storage volume of the capsule collector, it would also be possible to reduce the volume of the water reservoir by about 10 to 20%, e.g. by about 65 to 130 ml.

For systems that are different to the NESPRESSO standard, the ratio of the storage volumes may have to be adapted to the particular capsule configurations and size or volume of waste ingredient when the system does not use capsules. In particular when, as a result of a particular capsule system, capsules of larger overall size are required for preparing the same quantity of liquid, the volume of the capsule container will have to be adjusted accordingly to the large size of the capsules.

The normal storage volume of each container in which the level is monitored by a sensor corresponds to the total storage volume of the container. The containers in which the level is not directly monitored but merely expected to correspond more or less to the average use in the geographical market, should include a spare volume to account for non-average use, as just illustrated. When the predetermined level in all containers are monitored, then no spare volume is required. In this latter case, the normal volume of each container corresponds to its total storage volume.

Example 2

Based on the total user-demand of all the NESPRESSO capsules throughout Switzerland, i.e. the geographical market is the Swiss market, and on the recommended water quantity to be used for each type of coffee capsule supplied by NESPRESSO, it is estimated that the average quantity of water that is circulated through a NESPRESSO capsule mounts to 65 ml.

It follows that, on average, the volume of water needed for a capsule 1' stored in capsule receptacle 10' corresponds to 65 ml of water in water reservoir 5. Hence, for extracting and collecting 10 capsules in receptacle 10, the reservoir 5 will have to supply, on average, 650 ml. It follows that the water reservoir 10 should have a normal volume of 650 to 690 ml.

Example 3

Based on the total user-demand of all the NESPRESSO capsules throughout France, i.e. the geographical market is the French Market, and on the recommended water quantity to be used for each type of coffee capsule supplied by NESPRESSO, it is estimated that the average quantity of water that is circulated through a NESPRESSO capsule mounts to 62.9 ml.

It follows that, on average, the volume of water needed for a capsule 1' stored in capsule receptacle 10' corresponds to 62.9 ml of water in water reservoir 5. Hence, for extracting and collecting 10 capsules in capsule receptacle 10, the reservoir 5 will have to supply, on average, 629 ml. It follows that the water reservoir 10 should have a normal volume of 630 to 670 ml, taking into account that a user will hardly fill a water reservoir up to the rim. Hence, the reservoir will conveniently comprise a sign or mark indicating the maximum level of fill in the reservoir corresponding to a content of about 630 ml.

Example 4

Based on the total user-demand of all the NESPRESSO capsules throughout Italy, i.e. the geographical market is the Italian Market, and on the recommended water quantity to be used for each type of coffee capsule supplied by NESPRESSO, it is estimated that the average quantity of water that is circulated through a NESPRESSO capsule mounts to 43.5 ml.

It follows that, on average, the volume of water needed for a capsule 1' stored in capsule receptacle 10' corresponds to 43.5 ml of water in water reservoir 5. Hence, for extracting and collecting 10 capsules in capsule receptacle 10, the reservoir 5 will have to supply, on average, 435 ml. It follows that the water reservoir 10 should have a normal volume of 435 to 470 ml, taking into account that a user will hardly fill a water reservoir up to the rim. Hence, the reservoir will conveniently comprise a sign or mark indicating the maximum level of fill in the reservoir ˆcorresponding to a content of about 435 ml.

What is claimed is:

1. A machine for preparing a beverage from a combination of an ingredient and a liquid, the machine comprising:
    a housing comprising a front face and a back face on an opposite side of the housing from the front face, the housing containing an infusion chamber for preparing the beverage;
    a first container and a second container, the first container being a capsule receptacle and located underneath the infusion chamber, and the second container being a liquid reservoir, such machine constructed and arranged to let a user select a quantity ratio of the ingredient and the liquid for preparation of the beverage;
    a detecting member for detecting a predetermined level of fill in at least one of the first and second containers, the detecting member connected to a printed circuit board configured to activate an indicator to provide a single signal for indicating to a user that both the first and second containers of the machine need an action selected from the group consisting of refilling, emptying, and combinations thereof;
    a user-interface comprising the indicator and arranged to indicate to a user the detection of the predetermined level of fill and a message that either the first or second containers, or both, need refilling or emptying, as appropriate, before a further beverage may be prepared;
    a beverage outlet connected to the front face of the housing and configured to dispense the beverage prepared in the infusion chamber to a dispensing area underneath the beverage outlet, the beverage outlet is at a different position from the capsule receptacle; and
    an opening in the housing configured to receive the capsule receptacle, and a distance from a front of the opening to the back face of the housing in a horizontal direction is less than a distance from the beverage outlet to the back face of the housing in the horizontal direction.

2. The machine of claim 1, wherein the capsule receptacle is arranged to collect an item selected from the group consisting of (i) capsules after use for preparing a soup or a coffee, tea, chocolate, or milk containing beverage, (ii) waste ground coffee, and (iii) waste tea.

3. The machine of claim 1, wherein the user-interface is arranged to indicate with an explicit text or symbol sign that both the first and second containers need refilling or emptying.

4. The machine of claim 1, wherein the detecting member is arranged to detect a predetermined level of fill in each of the containers.

5. The machine of claim 1, wherein only one of the first or second containers is associated with the detecting member.

6. The machine of claim 1, wherein the user-interface includes light guides that are arranged to guide light generated by light emitting diodes (LEDs) to a wall of the capsule receptacle.

* * * * *